United States Patent [19]

Khan et al.

[11] Patent Number: 5,586,240
[45] Date of Patent: Dec. 17, 1996

[54] IMAGE GENERATION AND RETRIEVAL SYSTEM INTEGRATED WITH ARBITRARY APPLICATION USING LAYERED INTERFACE

[75] Inventors: Humayun H. Khan, Olathe; Wesley F. Potts, Leavenworth, both of Kans.; Russell R. McDonough, Belton, Mo.; Tracy F. Davis, Prairie Village, Kans.

[73] Assignee: Genesis Software, Inc., Kansas City, Mo.

[21] Appl. No.: 306,165

[22] Filed: Sep. 14, 1994

Related U.S. Application Data

[63] Continuation of Ser. No. 850,408, Mar. 11, 1992, abandoned.

[51] Int. Cl.⁶ .................................................. G06F 3/03
[52] U.S. Cl. .................................................. 395/769
[58] Field of Search .................................. 395/148, 158, 395/160; 358/403, 442, 468; 382/41, 282, 305

[56] References Cited

U.S. PATENT DOCUMENTS

| | | | |
|---|---|---|---|
| 4,553,261 | 11/1985 | Froessl | 382/306 |
| 4,616,336 | 10/1986 | Robertson et al. | 395/147 |
| 4,726,065 | 2/1988 | Froessl | 381/41 X |
| 5,047,960 | 9/1991 | Sloan | 395/149 |
| 5,058,185 | 10/1991 | Morris et al. | 382/305 |
| 5,060,135 | 10/1991 | Levine et al. | 395/155 |
| 5,109,439 | 4/1992 | Froessl | 382/305 |
| 5,133,024 | 7/1992 | Froessl | 382/282 |
| 5,153,936 | 10/1992 | Morris et al. | 395/128 |
| 5,157,739 | 10/1992 | Masaki et al. | 382/307 |
| 5,267,047 | 11/1993 | Argenta et al. | 395/149 |
| 5,367,619 | 11/1994 | Dipaolo et al. | 395/149 |
| 5,369,508 | 11/1994 | Lech et al. | 382/305 |
| 5,379,373 | 1/1995 | Hayashi et al. | 395/148 |
| 5,410,646 | 4/1995 | Tondevold et al. | 395/148 X |
| 5,448,372 | 9/1995 | Axman et al. | 358/403 X |

OTHER PUBLICATIONS

Sakauchi, Two Interfaces in Image Database Systems, Machine Intelligence & Vision, 1989, pp. 22–27.

Franca et al., A Station for Capture, Processing and Storing of Documents, Melecon'91, 1991, pp. 1264–1267.

Chang, Major Technical Issues in Medical Informatics Computer Technology Systems and Applications, 1990 Compsac, 1990, pp. 498–499.

*Primary Examiner*—Heather R. Herndon
*Assistant Examiner*—Anton W. Fetting
*Attorney, Agent, or Firm*—Chase & Yakimo

[57] ABSTRACT

An interface for establishing an imaging functionality with a user application program includes an alternative data input channel/buffer/storage combination which intercepts data stream information of a user application program without interference therewith. The diversion of the data stream into a separate storage area enables a hierarchy of control actions to be performed on the data stream without interference with the application program. The control actions in the form of programmable process control logic includes means for establishing a data pattern of selectable indicia associated with each screen of the user application program. The data pattern is combined with a positional key provided by the imaging system which is indicative of the location of the image document data in a database. This combination is stored in a key database and is available for comparison with subsequently formed data patterns. Upon a match being found the associated positional key is utilized by the imaging system to locate and display the imaged document. The use of the data patterns enables an interface to be established between the application program and imaging system without the need to modify the logic of the application program.

3 Claims, 10 Drawing Sheets

RENDER IMAGE

SYSTEM ARCHITECT

LEARNER

| APPLICATION'S NAME | CUSTOMERTRACKER237 ~1360 | | LIST |
|---|---|---|---|
| DRAWER NAME | CUSTOMERS237 ~1370 | | EDIT |
| SCREEN KEY* | CUSTOMER INFORMATION ~1382 | | DELETE |

| FOLDER NAME LABEL FOR KEY 1 | LAST ~1372 | KEY 1* | SMITH ~1373 |
| TAG NAME LABEL FOR KEY 2 | FIRST ~1374 | KEY 2* | HENRY ~1375 |
| LABEL FOR KEY 3 | ~1376 | KEY 3* | ~1377 |
| LABEL FOR KEY 4 | ~1378 | KEY 4* | ~1379 |
| LABEL FOR KEY 5 | ~1380 | KEY 5* | ~1381 |

[SET TEMPLATE]  [END LEARN MODE]  [CLEAR]

FIG. 9

GENERAL ACCOUNTING INCORPORATED
DATABASE MANAGER

CUSTOMER INFORMATION ~ 282

210 ~ LAST NAME: SMITH ~ 310
220 ~ FIRST NAME: HENRY ~ 320
230 ~ ADDRESS: RRO ~ 330
              METAIRIE, LA
240 ~ TELEPHONE: (204) 581-3232 ~ 340
250 ~ CUSTOMER NUMBER: 04022395856 ~ 350
260 ~ STATUS: CURRENT ~ 360

IMAGE GENERATION AND RETRIEVAL SYSTEM INTEGRATED WITH ARBITRARY APPLICATION USING LAYERED INTERFACE

This application is a continuation, of application Ser. No. 07/850,408, filed Mar. 11, 1993, abandoned.

BACKGROUND OF THE INVENTION

This invention relates to an imaging system, and more particularly, to a method and resulting interface for integrating standard imaging functionality with an existing user application program.

Heretofore the provision of imaging functionality to a user application program involved modifications to the software of the host user application. Such modifications were necessary to establish a logical link between the user application software and the imaging system. These modifications enabled the user to image certain physical documents in correspondence to a particular screen display of the user application. Such modifications can involve substantial software development resulting in significant time, trouble and expense.

Imaging systems are available which allow one to convert paper documents into imaged data. In order to access the imaged document, it is necessary for the user to transfer data from the displayed application screen to the imaging system. Once transferred the imaging system has sufficient information for finding the previously stored imaged document. As such systems do not readily establish a user interface between the various screens of the user application programs and the stored imaged documents the user environment can be awkward and ineffective.

Accordingly, it is desired to have means for integrating an existing imaging functionality to an existing user application program which easily establishes an interface between the user application and imaging system.

In response thereto we provide means for establishing an interface between the user application program and an imaging system so that an imaging functionality is integrated with the user application program without modification thereto. The interface utilizes a separate data channel/buffer/mailbox combination which receives therein an application data stream corresponding to the video terminal display of a data screen of the user application. The separate channel/buffer combination enables such a data stream to be monitored with no interference with the user application program. This diversion also allows a hierarchy of control actions, in the form of programmable control logic, to be performed on the data stream which relates selected data of the application screen with the imaging functionality. A screen template defines a method of accessing preselected data from an application screen so as to form a data pattern. The data pattern is then associated with a positional key of the imaged document as provided by the imaging system. Upon a subsequent display of the screen the template presents the defined accessing method such that the data pattern is again created. This function allows screen data patterns to be created and compared with previously stored data patterns as combined with a positional key of a corresponding imaged document. Upon a match of data patterns the associated positional key is used by the imaging system to locate the imaged document. Once located the imaged document is converted to a user readable form.

It is therefore a general object of this invention to provide an interface between an imaging system and a user application program.

Another object of this invention is to provide an interface, as aforesaid, which requires no modifications to be made to the logic of the application program.

Another object of this invention is to provide an interface, as aforesaid, which provides means of creating a pattern of preselected data from a screen display of the user application and associating the data pattern with an imaged document.

A further object of this invention is to provide an interface, as aforesaid, wherein positional information of the imaged document in a database is associated with the aforesaid data pattern.

Another object of this invention is to provide a screen template to said interface which defines an application screen to which the imaging functionality is to be provided.

A still further object of this invention is to provide a screen template, as aforesaid, which uses information from a screen display of the user application to establish a data relationship between the application and the imaging system.

Another object of this invention is to provide in said interface a screen template, as aforesaid, which provides a predefined method of accessing a selected data pattern according to the particular screen display.

Still another object of this invention is to provide a channel/buffer combination parallel to the host computer so as to monitor application screen data which defines the screen displays of the user application.

Another particular object of this invention is to provide a separate channel/buffer combination, as aforesaid, which enables a hierarchy of control operations to be conducted on the screen data without interference with the user application program.

A still further object of this invention is to provide an interface, as aforesaid, which presents an organizational indexing structure for accessing the imaged documents from a database.

Other objects and advantages of this invention will become apparent from the following description taken in connection with the accompanying drawings, wherein is set forth by way of illustration and example, an embodiment of this invention.

DESCRIPTION OF THE DRAWINGS

FIG. 9 is a diagram of the graphical interface of the template as presented to the user.

FIG. 10 is a diagram of a screen display of an application program with which the imaging functionality is to be attached.

DESCRIPTION OF THE PREFERRED EMBODIMENT

Figure 1:
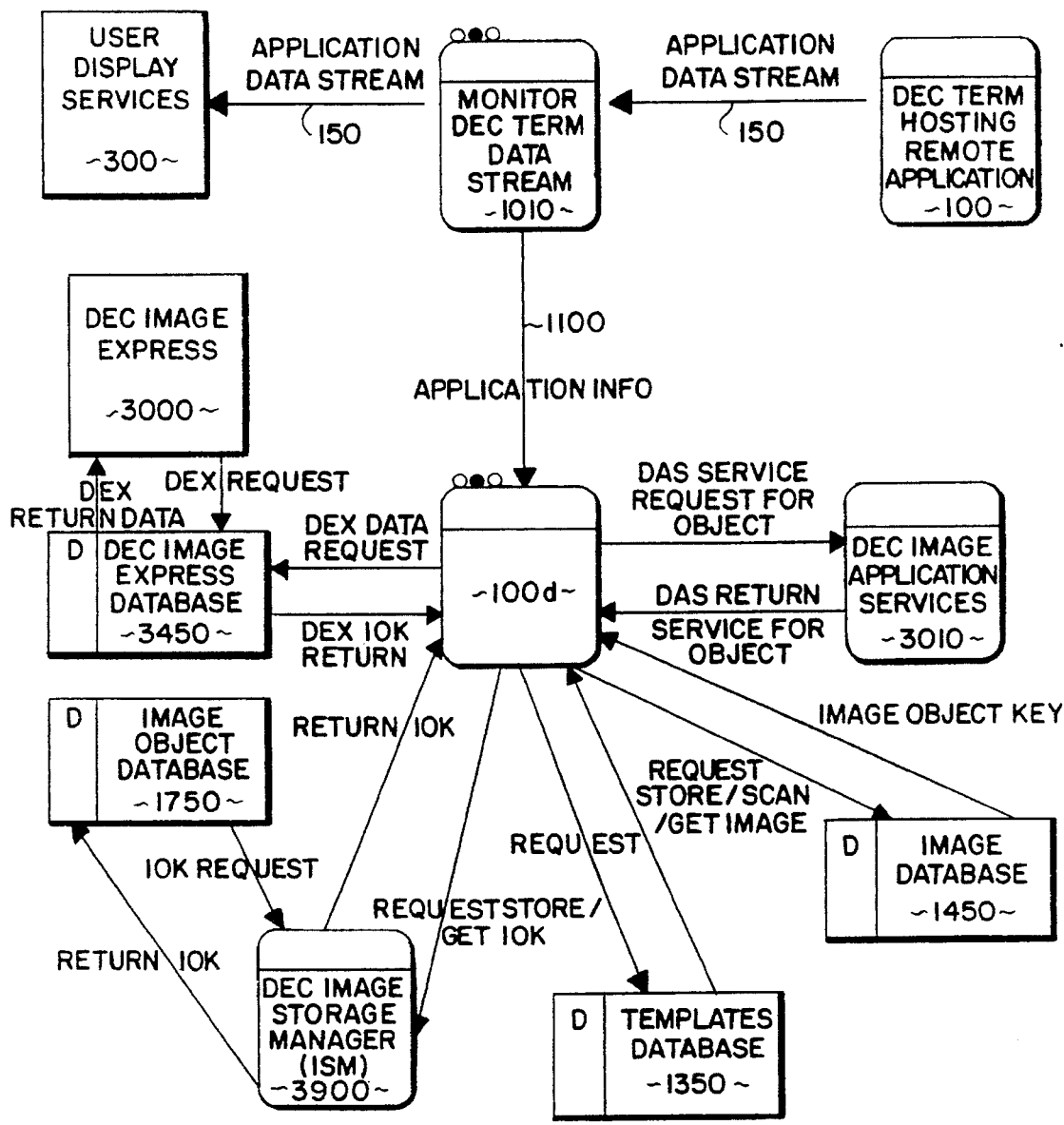
FIG. 1 is a context diagram indicating the overall integration of the imaging system with a user application program.

Imaging systems are available which provide an imaging functionality. Such systems, a combination of hardware and logic software, optically scan a paper document, convert the document to the imaged data and store the imaged data or document in an image object database. An image manager stores and displays the imaged document upon request by the user. The user must provide identifying indicia to the image manager which corresponds to selected indicia found in the imaged document. Once provided, the corresponding imaged document may be stored and/or retrieved from the image object database.

Although these systems provide the necessary software and hardware to allow for image document storage and retrieval, there is no ready interface between the user application program and the imaging system. To obtain such a desired interface, the software of the user application program must be modified, possibly at great expense, to link the program to the imaging system. In our now preferred embodiment, we provide an independent interface 1000 comprising hardware and programmable process control logic which integrates the imaging functionality of an imaging system to user application software 100 without modification thereto.

One basic imaging system 3000 which may be used for integration is the DECimage EXpress System owned by Digital Equipment Corporation. The software version of such system is version FT.3 and is used in connection with a VMS version 5.4 operating system.

In a stand alone configuration the minimum hardware requirements of the DEC system are as follows:

HARDWARE

1. VAXstation Workstation 3100, Model 48, 32 Mb memory
2. 3-RZ23 (104 Mb memory each)
3. Image/3L Accelerator Module
4. MD400 or MD410 scanner The minimum hardware requirements for a multinode configuration are as follows:
1. Server node
   a. VAXserver 4000 Model 200
   b. TLZ04/RRD40 Controller
   c. Video Terminal
   d. 381 MB DSSI ISE Internal disk drive
   e. Compact disk drive
   f. LN03 Image Printer
   g. Image/3L Accelerator Module Scanner Station Client
   a. VAXstation Workstation 3100, Model 48, 32 Mb
   b. 3 RX23 disk drives
   c. MD400 or MD410 scanner
   d. Image/3L Accelerator Module
3. Imaging Client Station
   a. VAXstation Workstation 3100, Model 30, 16 Mb
   b. Monochrome monitor
   c. Keyboard
   d. SCSI/SCSI Disk Drive Controller Kit
   e. 2-104 MB Disk Drives
   f. Image/3L Accelerator Module OR
   g. DI1200- DECimage Terminal
4. Other processors supported as multinode servers include the following:
   a. VAX 4000 Model 300 Series
   b. VAX 9000 Model 210 Series
   c. VAX 9000 Model 410 Series
5. Optional hardware is as follows:
   a. Perceptics LaserStar JB02-2
   b. Perceptics LaserStar JB03-2
   c. Perceptics LaserSystem MS1200
   d. MD300 Scanner
   e. Recoh IS50 Scanner
   f. LN03 Image Printer
   g. PrintServer 20
   h. PrintServer 40 Plus
   i. Intel 80386 or 80486 PC
6. IBM Connectivity Hardware
   a. DEC ChannelServer II (SNA Channel Gateway to IBM Host)
   b. DEC MicroServer (SNA Synchronous Gateway to IBM Host)

For more information on hardware configurations, see the *DECimage EXpress System Manager's Guide,* and the *DECimage EXpress System Support Addendum.*

SOFTWARE

The minimum software requirements for establishing the interface 1000 with DECimage are as follows:
1. DECimage EXpress Version 2.0 Software, which consists of:
   a. Server Software
   b. Client Software
2. VMS Version 5.4-2 or higher, which includes:
   a. DECwindows Version 2.0
   b. DECimage Application Services Version 3.1 Runtime
   c. DECnet-VAX V5.3
3. VAX Rdb Runtime - V4.0 (Includes VAXSQL Version 2)

To support the optional hardware, the following software may be required:
1. DECimage Scan Software for VMS, Version 2.0
2. VAX Scriptprinter Software Version 2.1
3. VAX LN03 Image Support Software Version 1.0
4. LPSxx server software
5. LaserWare V2.1 for LaserSystem MS1200 support
6. LaserStar V2.02 for LaserStar JB02-2 and LaserStar JB03-2 optical drive cabinet support
7. PC DECwindows Display Facility IBM Connectivity Software
1. DECnet/SNA Gateway Channel Transport Software
2. DECnet/SNA Gateway Synchronous Transport Software
3. VMS/SNA Gateway Software For more information on DECimage Express software requirements, see the
1. DECimage EXpress System Manager's Guide
2. DECimage EXpress System Support Addendum 3. FAX Network Gateway Application Management Guide
4. FAX Network Gateway Installation Guide
5. FAX Network Gateway User's Guide
6. VMS DECwindows Desktop Applications Guide
7. VMS System Management Library It is understood that the above hardware and software requirements are for purposes of illustration and not limitation.

Turning more particularly to the drawings, FIGS. 1–10 illustrate our novel interface 1000 in the form of hardware modifications and control means in the form of programmable process control logic which link the user application program 100 to an imaging system 3000 with no need to internally modify the logic of the user application program 100.

FIG. 1 illustrates a flow diagram of the system architecture of a completed imaging system as presented by the interface 1000 of the user program 100 with the imaging system 3000. The user application program 100 is running on a host computer. The user application displays various data screens (FIG. 10) on a video terminal.

Software which offers a "window" capability to the terminal is provided. Such a capability allows the user to view either the user application program 100 or the graphical controls provided by the programmable software logic embodied in the interface 1000.

As stated, the user application program 100 will display a plurality of data screens on the terminal screen. It is these screens with which physical documents are to be associated in an imaged data form. For purposes of illustration, an example of an application screen 200 is shown in FIG. 10. As shown, certain customer information, as dictated by descriptive screen labels 210, 220, 230, 240, 250, 260 are displayed by the application program 100 on the terminal screen. Variable data fields 310, 320, 330, 340, 350, 360 are associated with each label and will display data normally exclusive to each customer. Thus, the screen 200 will have a format predetermined by the user application program 100 as to headings, labels and the like with variable data information therein. The user desires to associate a physical document in an imaged form with the particular customer information screen 200 as displayed on the terminal.

As included in the interface 1000, FIG. 1 illustrates the monitoring 1010 of application data stream 150 information displayed on the terminal associated with the host computer of the user application 100. This application data stream 150 is emulated 300 by the user display services of the host computer system. As to be discussed, the terminal is modified so as to allow the application data stream 150 to be monitored without interference with the user application 100 and its associated terminal. This monitoring 1010 function initiates an interface 1000 of the user application 100 screen, as shown on the video terminal screen, without internal modification to the programmable logic of the user application program 100.

As further shown in FIG. 1, application information 1100, which is a "dump" of the application data stream 150, is directed downstream for integration into various functionalities of the system. This integration 1000 includes a separate channel 1415/buffer 1450/mailbox 1460 combination (hereinafter referred to as the "integrator memory and/or stream buffer 1510") for receiving the application information 1100 and delivering the same to various functionalities as defined by various forms of programmable process control logic. The interface 1000 includes a template 1300 presented as a graphical interface (FIG. 9) on the terminal screen to the user. This template 1300 controls the selection and manipulation of the application information in the integrator memory 1510. A hierarchy of control actions on the application information 1100 provides a user selectable interface between preselected data on the screen 200 and the user application program 100 as to be subsequently described. Once the application information 1100 is so integrated, documents can be converted by the imaging system 3000 into an image data form and associated with the user application screen 200. Requests for the display/recall of the imaged document(s), as associated with a particular user application screen, can then be made.

The interface 1000 includes means for establishing a number of data templates 1300 for each application program 100 and storing the same in a templates database 1350. Each template 1300 provides a data interface with the screen data displayed by the user application program on the terminal. Establishment of the template 1300 creates a pattern of accessing the variable data from certain preselected fields of the screen, e.g. screen 200. The gathered data presents a data pattern which is associated with the document's data as stored in the image object database 1750. It is this template 1300 which presents the heart of the interface process.

Figure 3:
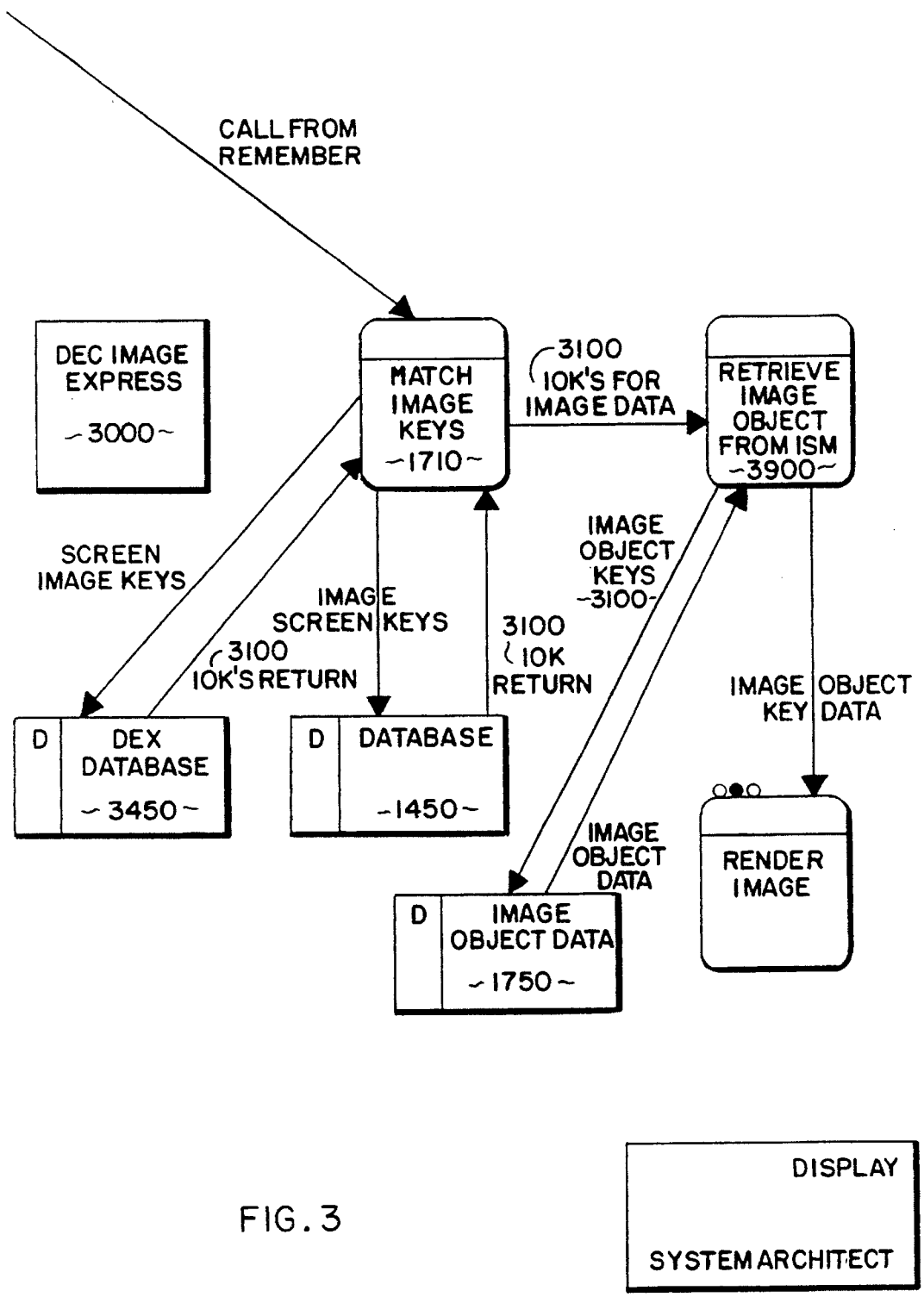
FIG. 3 is a flow diagram indicating the primary steps utilized in the display functionality.
Figure 4:
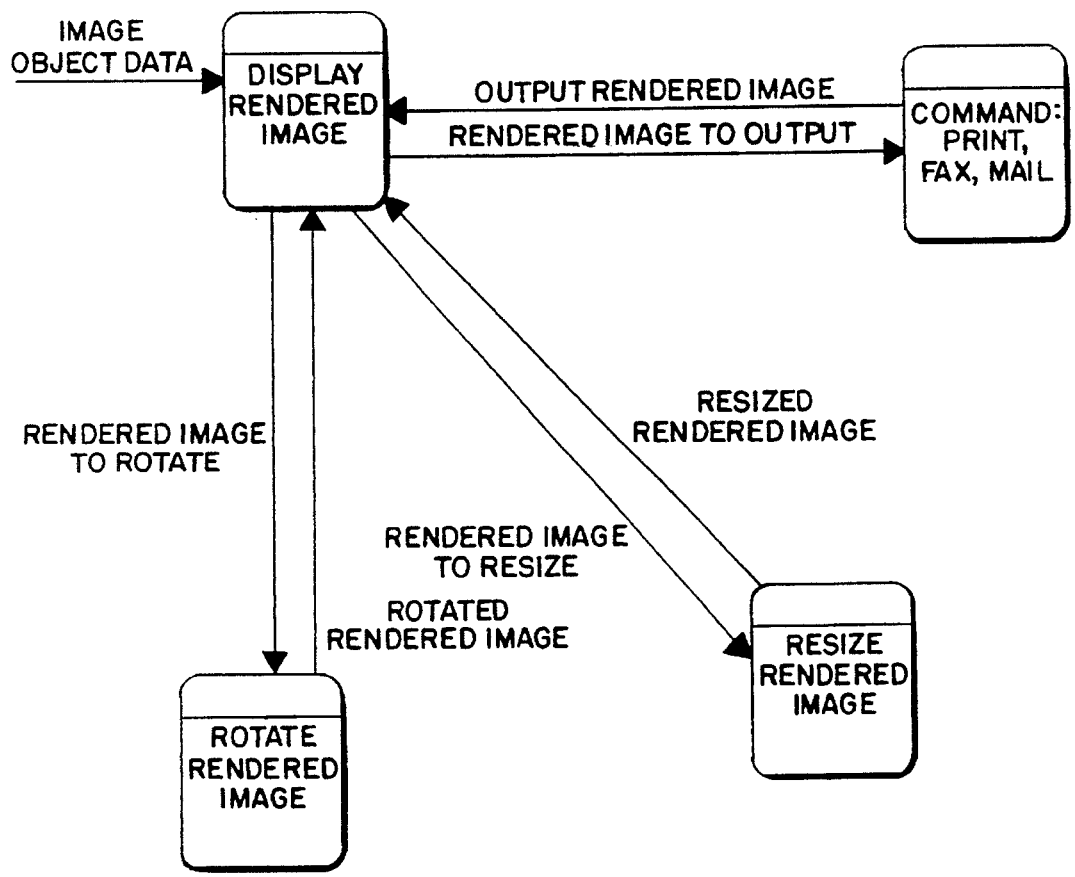
FIG. 4 is a flow diagram indicating the primary steps utilized in the manipulation of an imaged document.

The request to "display" an imaged document initiates the execution of programmable process control logic to perform the steps as shown in FIG. 3. The established template 1300 accesses the data from the screen according to the previously established pattern. A search in the integrator key database 1450 or the imaging system key database 3450 seeks to locate a previously stored identical data pattern. A match of such data pattern must be found in either key database 1450, 3450. Otherwise, no imaged document has been previously associated with that user application screen. Once an identical data pattern match has been found, positional information in the form of an "image object key" or "IOK" 3100 is delivered to the manager 3900 of the imaging system 3000. This image key 3100 has previously been associated with the data pattern upon a previous scanning of the document into an image data form and storage of the image data in the image object database 1750. Upon storage the IOK 3100 was provided by the image storage manager 3900 of the DEC imaging system 3000. The storage manager 3900 utilizes this positional key 3100 to subsequently recall the image data, associated with such key 3100, from the image object database 1750. The imaged data is then converted to user readable form and displayed or rendered on the user screen. As shown in FIGS. 1 and 4, the basic imaging system 3000 provides services 3010 which enables the user to manipulate the document on the screen, e.g. rotation, scaling and printing of the imaged document.

It is herein noted that most imaging systems will return data corresponding to positional information of the imaged document in an associated image object database. This positional data or key is used by the system to subsequently locate the imaged document in the system database. Thus, a positional key will normally be available upon integration of the interface 1000 with the basic imaging system, irrespective of the imaging system utilized.

Figure 8:
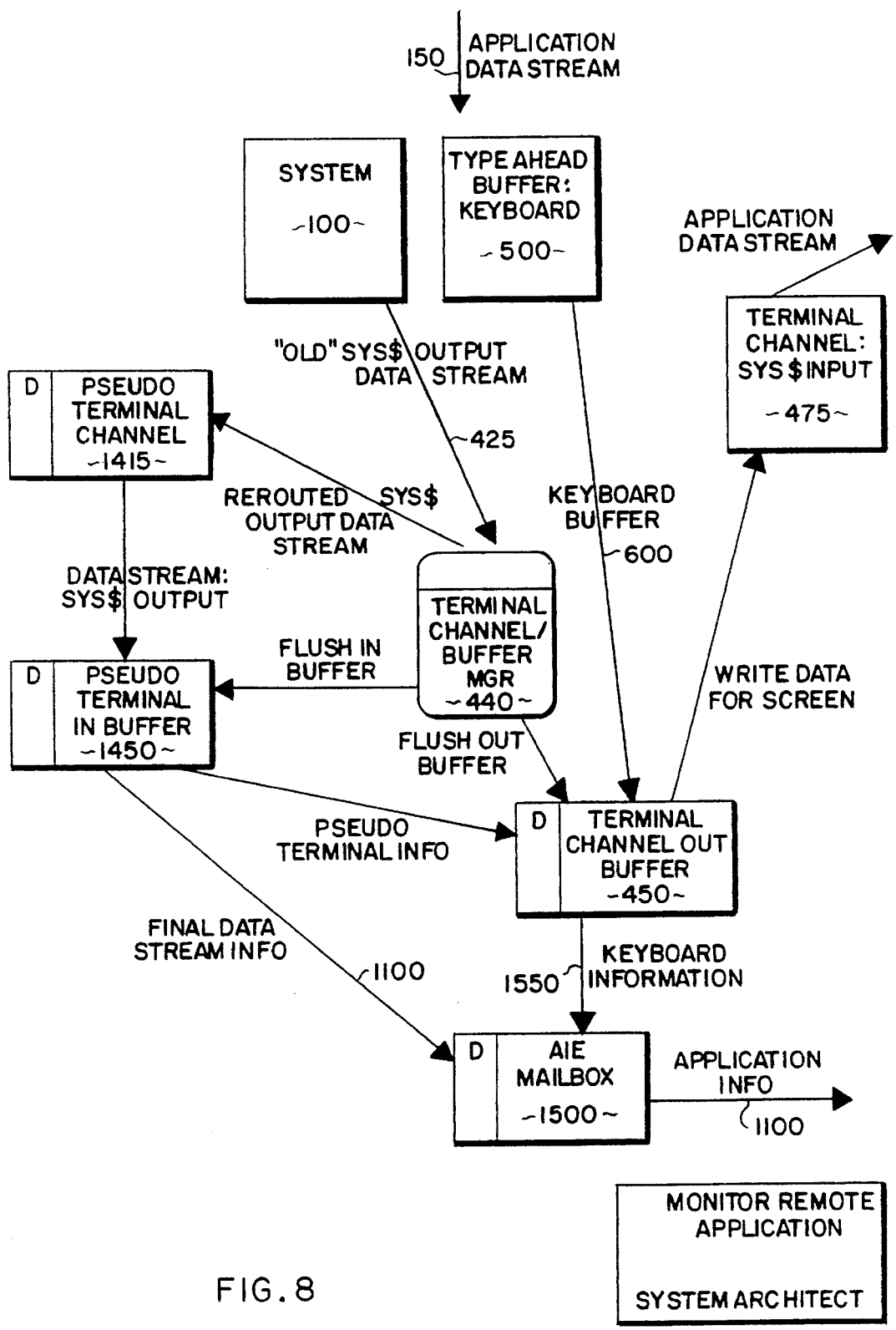
FIG. 8 is a flow diagram indicating the primary steps and means employed to monitor the user application.

FIG. 8 more particularly illustrates the method and hardware utilized for the monitoring 1010 functionality of the application data stream 150 of the user application screen as displayed on the user application terminal. The variable data in the application data stream 150 can be generated by the application program 100 or separately entered through the terminal keyboard 500. The application data stream 150 is normally routed from the application 100 through a data channel 425 and to a buffer 450 by an integrated buffer manager 440 of the host computer operating system. The buffered 450 information is then directed to the output terminal channel 475 for ultimate display on the terminal screen. Concurrently, this same application data stream 150 information is re-routed in parallel through an input channel 1415 and into an alternative or pseudo buffer 1450. As shown, the buffer manager 440 periodically clears the data residing in both buffers 450, 1450. Information flushed from the alternative buffer 1450 is directed to a computer memory area called a "mailbox" 1500. (As stated this combination is generally referred to as a stream buffer/integrator memory 1510.) The data stream information as routed to mailbox 1500 is then delivered as application information 1100 to the integrator 1000. Accordingly, programmable process control logic, separate from the user application 100, is able to perform a hierarchy of various control operations on this separated application screen data 1100 in order to perform the various illustrated and to-be-described functionalities.

Information may also be separately entered in the variable data fields, e.g. 310–360 (FIG. 10), on the video screen via the keyboard 500. Upon keyboard 500 entry, the screen display is directed to a keyboard buffer 600 and into the buffer 450. This keyboard information 500 is then routed to the "mailbox" 1500 as well as to the terminal output channel 475.

This establishment of a pseudo terminal channel 1415/ buffer 1450/mailbox 1500 interface, independent of the normal channel 415/buffer 450 associated with the application program 100, allows the application data stream 150 to be monitored and offered as separate data stream information 1100. As such data 150 is being monitored and stored in memory external of the user application program 100 there is no need to internally modify the software of the same. Such hardware assists in providing the basic linking means between the user application 100 and the imaging system 3000.

Figure 2:
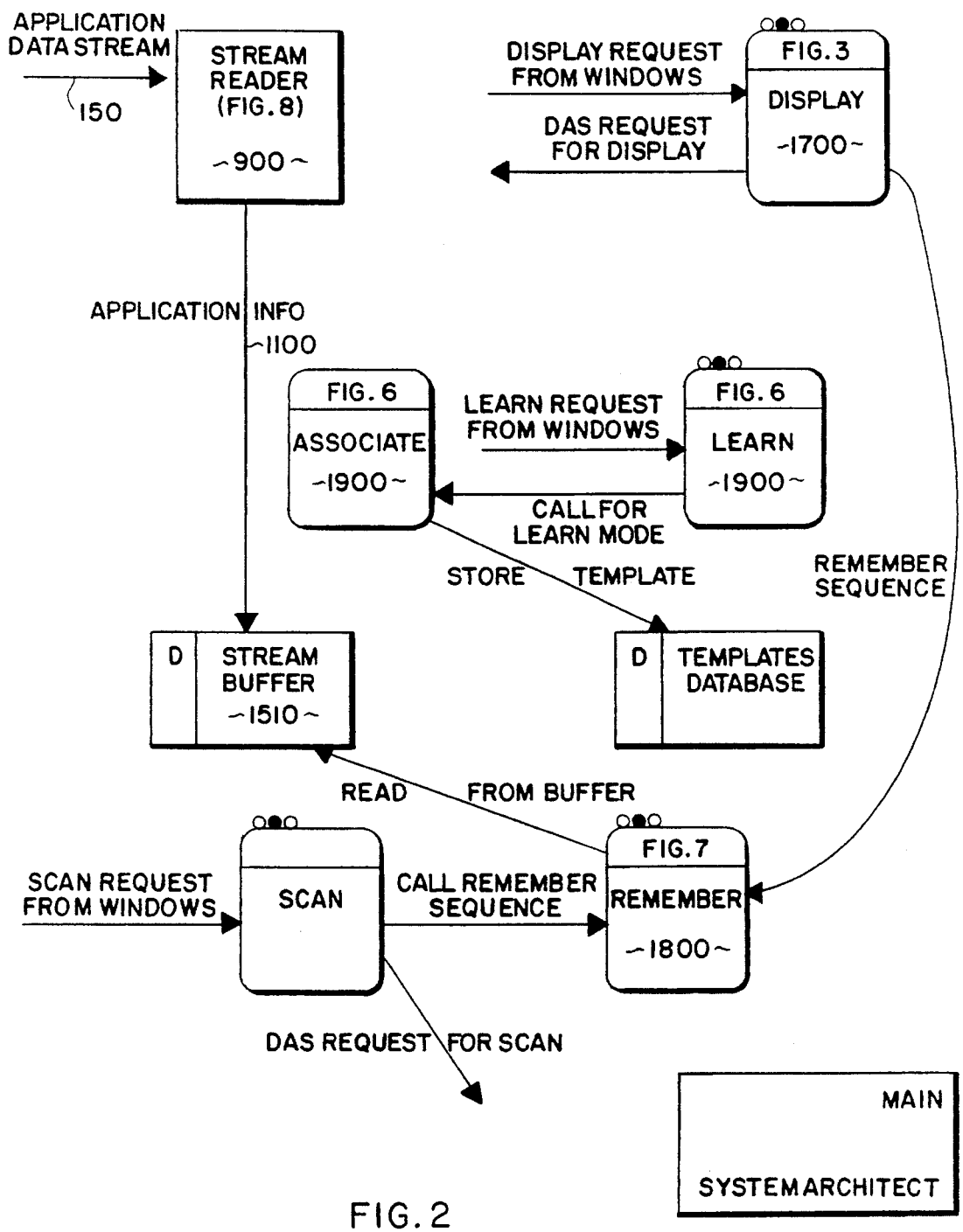
FIG. 2 is a flow diagram indicating the main functionalities provided by the interface between the imaging system and user application program.

FIG. 2 further illustrates the main functions of the integrator 1000. The stream reader 900 presents the separated application information 1100 as shown in FIG. 8. A display request of an imaged document associated with a user screen can be initiated by means of graphical control interfaces displayed in a window on the video terminal screen. The display request effects/initiates the execution of programmable logic controlling the display/remember 1800 functionalities and calls into play the template 1300 associated with the application screen 200. Template 1300 may be one template of a plurality of templates associated with the various screens of the user program 100 and stored in a templates database 1350. The particular template 1300, as graphically presented in FIG. 9, has been associated with the particular FIG. 10 screen format by the learn or associate functionality 1900. As above stated the template 1300 now presents a control pattern to guide the access of relevant variable data information from the FIG. 10 screen display. This data pattern is used for finding the imaged document which was associated with the data pattern upon scanning (FIG. 6) the document into the image object database 1750.

Figure 6:
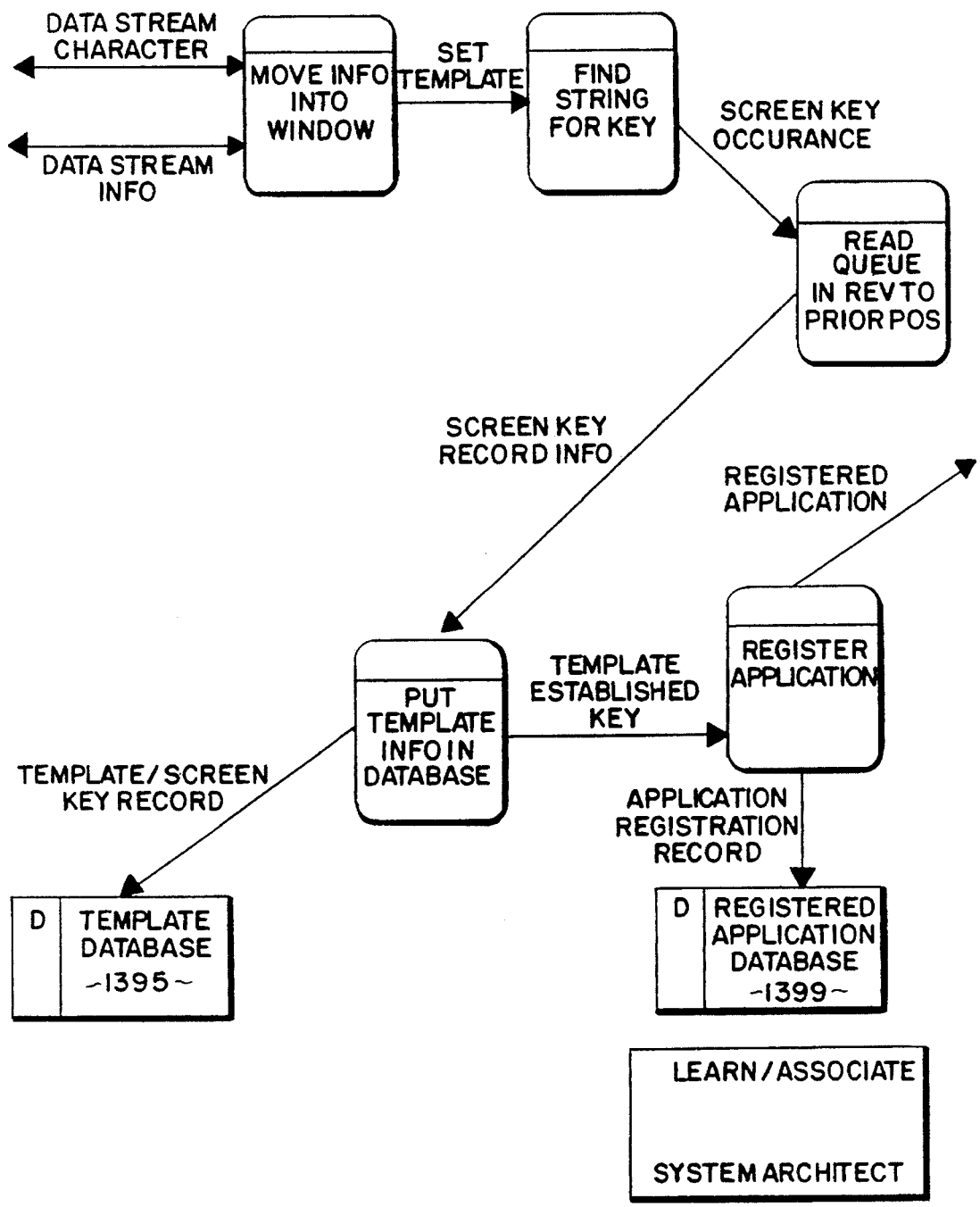
FIG. 6 is a flow diagram indicating the primary steps employed in the method of the imaging associate/learn functionality.
Figure 7:
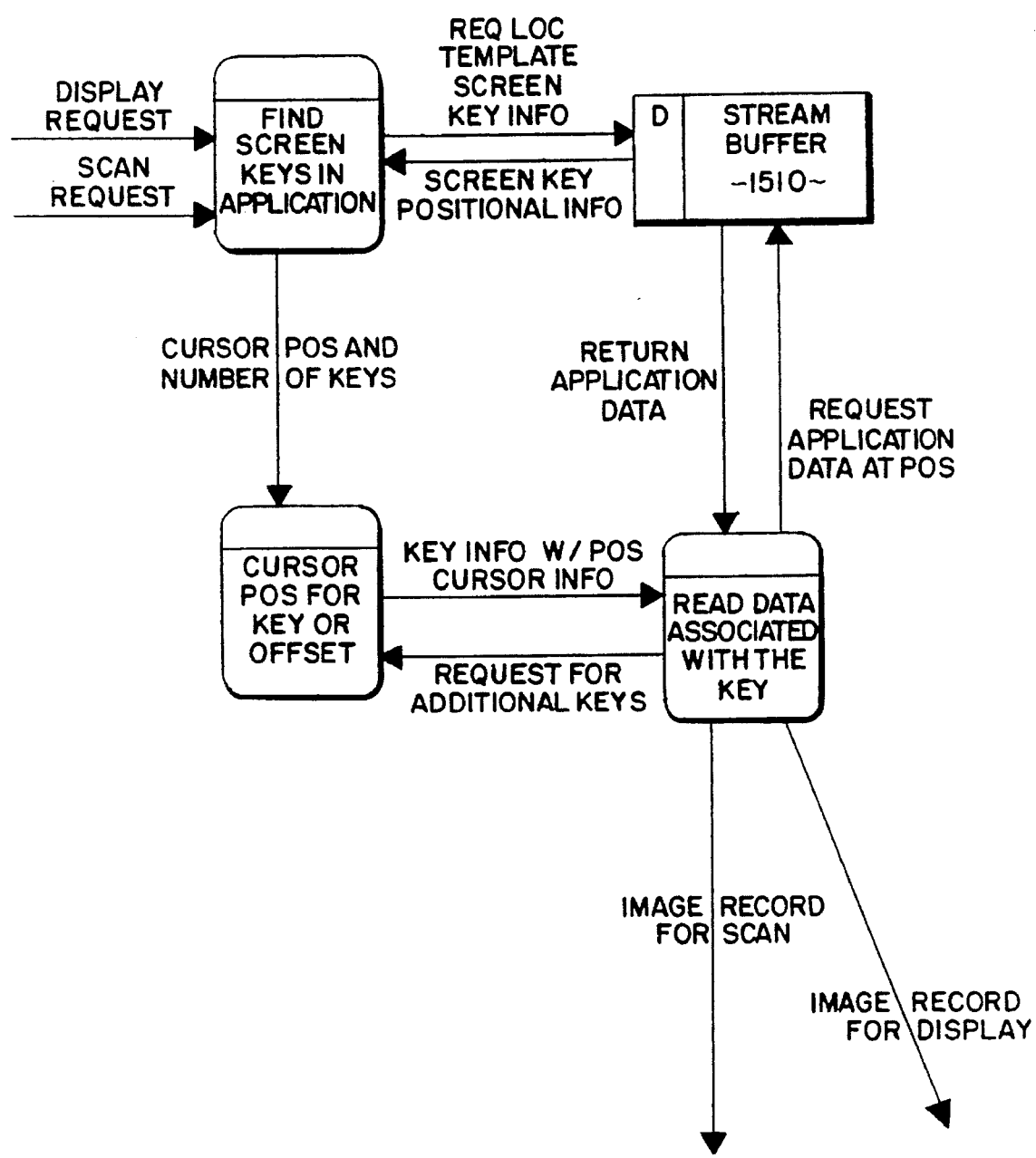
FIG. 7 is a flow diagram indicating the primary steps employed in the method of the imaging remember functionality.

The "template" 1300 provides the basic user interface between the application program 100 and the imaging system 3000 functionality. Once a template 1300 has been associated/registered with a particular user application screen it provides a continuing interface between that user program 100 screen and the imaging functionality of system 3000 even though the variable data therein is changing. The establishment of this associate/learn functionality 1900 is shown in FIG. 6. The template 1300 is graphically presented to the user in a window on the application screen as shown in FIG. 9. The template 1300 presents fields for displaying logical interfaces between the screen (FIG. 10) and template (FIG. 9). Such selectable interfaces include the user application name 1360, a drawer name 1370 and screen key or screen title 1382. The screen key 1382 is normally the title of the particular screen in the user application program 100. The drawer name 1370 indicates a division of logical storage in the image object database 1750 and is used by the image storage manager 3900 of the associated imaging system 3000. The folder name 1372 is a further logical division of the drawer with the tab 1374 being a subdivision of the folder. Labels 1376, 1378, 1380 present further logical subdivisions. As a matter of system design, it can be appreciated that the more indices utilized the easier it is to find a document in the database 1750. However, the more indices that are used reduces the possibility of the particular image object database 1750 being used by other screens which may not have all the desired indices.

The selection of the label indicia 1372, 1374 1376, 1378, 1380 designate the type of information or key data from the FIG. 10 screen that will be entered in the accompanying data fields 1373, 1375, 1377, 1379, 1381. Such key data is used to create a character string or data pattern of variable data appearing on the different customer information application screens (FIG. 10). The actual variable screen data, associated with the label names, are specified as image storage keys. For each key data field designated as a label in the template 1300 the actual data from the variable fields 310, 320, 330, 340, 350, 360 of the user screen 200 is moved to the appropriate key data fields 1373, 1375, 1377, 1379, 1381 in the template 1300. (It is noted that only the drawer 1370 and folder 1372 fields need to be used.) The maximum length of characters for each key data field is also associated with each template 1300. It is noted that as only two labels have been designated, i.e. the last name 1372 and first name 1374, only two key data fields 1373, 1375 are entered, i.e. Smith and Henry. This variable data is present in the corresponding fields 310, 320 in the user screen 200.

Once the template 1300 is "set" the registered template 1300 will contain a string of key data information which will indicate the number of keys that have been selected on that screen 200, the location of the data field on the screen 200 for each key and the maximum length of the data field for each key. This positional information will be subsequently used to assemble the key data into a data pattern for all subsequent occurrences of that particular user application screen irrespective of the variable data appearing in each selected label field 310, 320 on the terminal screen. The data of the currently displayed screen, residing in the integrator memory 1510, is then read in reverse to assemble the positional information pattern and a check is made for any multiple occurrences of the same key. This positional screen information, as associated with the screen 200, is put into a template database 1395. Concurrently, the application name 1360 and screen key 1382 of the template 1300 is registered and placed in a registered application database 1399. Upon the subsequent occurrence of a user screen in the application program, the application name 1360 and screen key 1382 is first checked in the registered application database 1399 to see if the template 1300 has been registered for that application and screen name. If so, a means for accessing a data pattern from that particular screen is known to be available as found in the associated string of key data positional/length information.

Upon a display request of an imaged document, as shown in FIG. 3, the control logic of the interface 1000 ascertains whether the displayed user screen has a registered template 1300. If so, the template 1300 associated with the particular user screen is located. Control logic in the form of the remember functionality, as shown in FIG. 8, is then called. The template 1300 positional information indicates what data on the screen and its screen position is to be used to locate the associated imaged document in the image object database 1750. As illustrated, the position of the screen keys in the integrator memory/stream buffer 1510 is first determined. The current position of the cursor in the buffer 1510 is then determined. The data associated with each of the keys is then gathered from buffer 1510 and assembled into the data pattern or image key for either displaying or scanning the imaged document.

The display functionality of the imaged document is then effected as shown in FIG. 3. The data pattern 1710 or image keys 1710, as compiled by the remember 1800 functionality, is compared to the data pattern previously associated with the "IOK" 3100 of the imaged document as stored in the Dex or integrator databases 1450, 3450. Once a match is found, the image object key 3100 is delivered to the image storage manager 3900 of the original imaging system. The image storage manager 3900 utilizes this key 3100 to find the imaged document in the image object database 1750. Once found the imaged object is displayed on the terminal screen.

Figure 5:
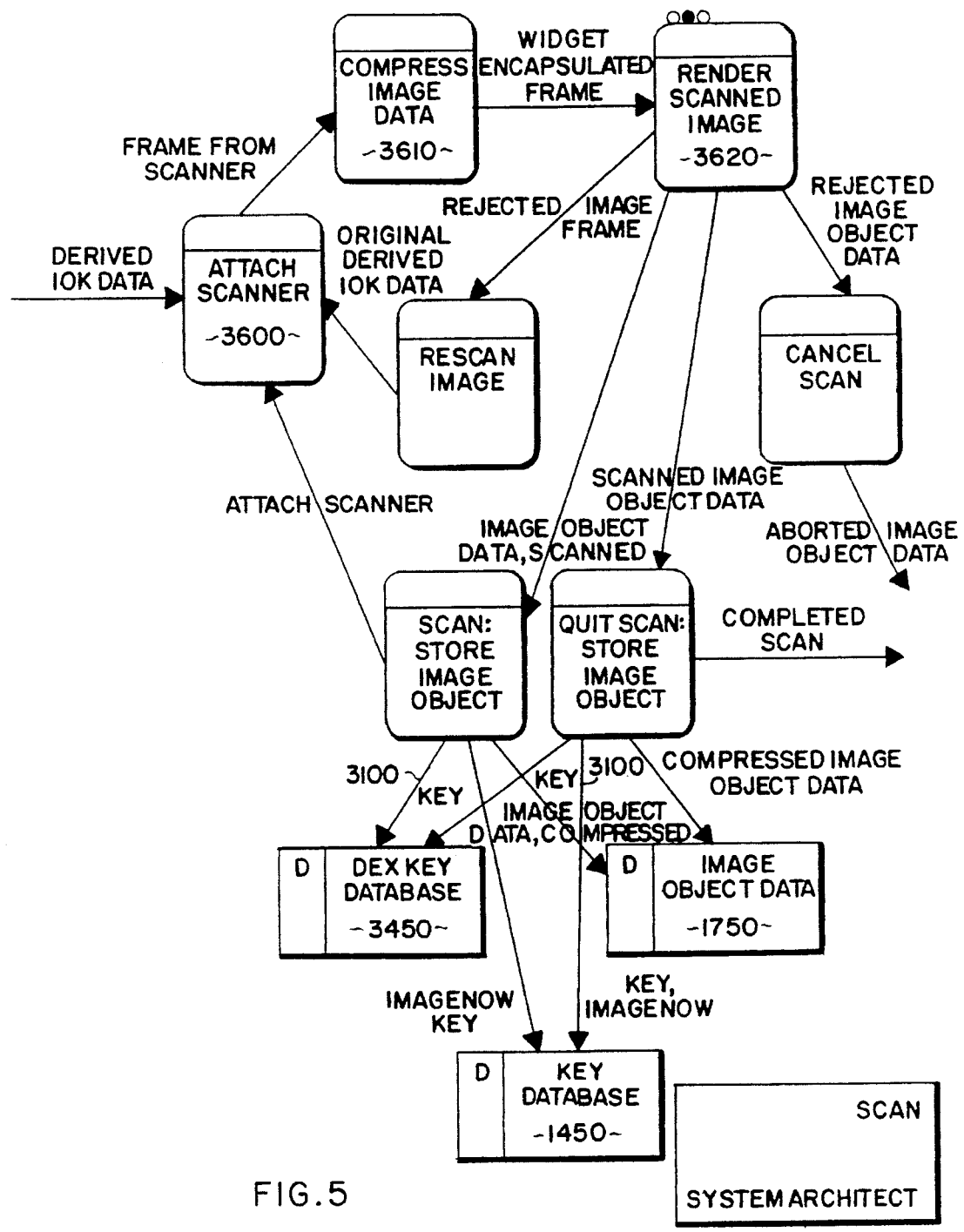
FIG. 5 is a flow diagram indicating the primary steps utilized in the scanning functionality.

Prior to display of an imaged document, the document must have been stored or "scanned" into the image object database 1750. As shown in FIG. 2, the scan request initiates a FIG. 7 logic flow identical to the display request. Thus, a data pattern 1710 is gathered from the stream buffer 1510 as dictated by the associated template 1300 registered for that screen. Once so gathered the document is optically read into the system by the scanner 3600 of the imaging system 3000 as shown in FIG. 5. As shown, positional information in the form of an image object key 3100 is presented which will indicate where the scanned document is to be located upon storage in the image object database 1750. The scanner 3600 converts the document to imaged data, compresses 3610 the image data and then displays or renders 3620 the document to the user on the terminal screen. If satisfied with the document appearance, the image object key 3100 is associated with the data pattern 1710 and then placed in the key databases 1450 or 3450. Thus, a positional key 3100 and associated data pattern 1710 may be found either in the system key database 3450 or in the interface database 1450. (A pair of databases 1450, 3450 are utilized as it is effective to store documents that have been "batch scanned" by the DecImage Express into a separate database 3450.) Such a combination of IOK 3100 and data patterns 1710 can be moved from database 3450 to database 1450 if so desired. The image object is then stored in a database 1750 at the position designated by the image object key 3100. Thus, subsequent requests for display will gather a current data pattern from the screen as dictated by the template 1300. A search for the data pattern is then made in the key databases 1450, 3450. Once found the associated image object key 3100 is presented to the image storage manager 3900. The imaged document is then displayed to the user.

To summarize the use of the interfaced imaging system, the user displays the application 100 screen on the terminal with which an imaged document is to be associated. The registered template 1300 will present a control pattern which determines the assemblage of variable key data from that screen which is to be associated with the imaged document. The actual document will then be scanned 3600 into the system. An image object key 3100, as returned by the system manager 3900, will indicate the position of the document in the image object database 1750. The data pattern information, as accessed from the user application screen, will be associated with that image object key 3100 in object key databases 1450, 3450. This scanning process is repeated for each change of variable key data of each application screen for which an imaging functionality is desired.

Subsequently, upon a desired display of the imaged document, the template 1300 associated with the user screen will control an assemblage of data of the displayed screen information, as it appears in the stream buffer 1510, according to the access pattern learned by that template. The data pattern will then be compared to data patterns previously stored in the image object key database 1450, 3450. Once found, the associated image object key 3100 will then be delivered to the image system manager 3900 which will use the key 3100 to locate the document in the imaged object database. Once located, it will display the same.

As above described, it can be seen that the use of the templates 1300 to create data patterns of screen information from application information 1100 which has been diverted to a separate stream buffer 1510, enables an interface to be easily established between an imaging system 3000 and a user application program 100 without the need to alter the application program. As the utilized imaging system remains consistent, it is only necessary to initially integrate the programmable control logic with the imaging system.

It is also understood that one skilled in the art when presented with the above can provide various forms of programmable control process logic to establish the above functionalities.

Although a now preferred form of this invention has been described it is understood that the utilization of this invention need not be restricted to a DecEXpress imaging system 3000 as the concepts of our disclosed invention can be utilized with other systems providing an imaging functionality.

It is to be understood that while certain forms of this invention have been illustrated and described, it is not limited thereto except insofar as such limitations are included in the following claims and allowable functional equivalents thereof.

Having thus described the invention what is claimed as new and desired to be secured by Letters Patent is as follows:

1. A method for associating image data of a document with a selected screen display of an user application program with the document being manipulated by an independent image system capable of storing and retrieving the document in an image data form, the method comprising the steps of:

directing a first stream of data information from the user application program corresponding to the selected screen display to a video terminal;

rendering the first stream of data information corresponding to the user application screen display on a video terminal;

splitting said first stream into a parallel stream of said data information forming said screen display without interfering with said first stream of data information of said screen display;

monitoring said parallel stream without interfering with said first stream;

selecting label indicia of the screen display, said indicia identifying variable data associated with the indicia, the data provided by the user application program;

utilizing said parallel stream for calculating a position of each of said selected indicia and associated data in the screen display;

placing the calculated positions of each of said selected indicia in the screen display in a first storage area;

choosing a document to correspond with said selected screen display;

transporting said document to a scanner of the imaging system;

utilizing the image system scanner for optically scanning the transported document for generation of image data therefrom corresponding to said document;

utilizing the image system for storing said image data in a second storage area;

utilizing the image system for calculating a position of the stored image data in said second storage area;

recalling from the first storage area the calculated positions of each of said selected indicia in the screen display;

assembling the data appearing at each of said calculated positions of said selected indicia in the screen display into a data string;

associating the calculated position of the stored image data in said second storage area with said data string;

storing said associated calculated position and said data string in a third storage area.

2. The method as claimed in claim 1 further comprising the step of displaying the stored image data from said second storage area to user corresponding to the document associated with the selected screen display.

3. The method as claimed in claim 2 wherein said display step comprises the steps of:

rendering the selected user application screen display on the video terminal, said selected application screen display being formed by said first stream of data information;

recalling said calculated positions of each of said selected indicia of said rendered screen display from said first storage area;

gathering from said parallel stream of data information forming the screen display, the data appearing on the screen at each of said calculated indicia positions into a data string;

matching the gathered data string with the data string stored in said third storage area;

finding a position in said second storage area corresponding to the calculated position associated with the matched data string in said third storage area;

converting said image data at said found position into a user readable form.

* * * * *